US009249909B2

(12) United States Patent
Ikushima

(10) Patent No.: US 9,249,909 B2
(45) Date of Patent: Feb. 2, 2016

(54) SEAL STRUCTURE FOR FLOW-PATH CONNECTION PART

(71) Applicant: MUSASHI ENGINEERING, INC., Mitaka-shi, Tokyo (JP)

(72) Inventor: Kazumasa Ikushima, Mitaka (JP)

(73) Assignee: MUSASHI ENGINEERING, INC., Tokyo (JP)

( * ) Notice: Subject to any disclaimer, the term of this patent is extended or adjusted under 35 U.S.C. 154(b) by 0 days.

(21) Appl. No.: 14/364,935

(22) PCT Filed: Dec. 12, 2012

(86) PCT No.: PCT/JP2012/082147
§ 371 (c)(1),
(2) Date: Jun. 12, 2014

(87) PCT Pub. No.: WO2013/089120
PCT Pub. Date: Jun. 20, 2013

(65) Prior Publication Data
US 2014/0375051 A1    Dec. 25, 2014

(30) Foreign Application Priority Data
Dec. 13, 2011    (JP) ................. 2011-272024

(51) Int. Cl.
*F16L 17/00* (2006.01)
*F16L 23/22* (2006.01)
(Continued)

(52) U.S. Cl.
CPC ................. *F16L 23/22* (2013.01); *F16J 15/10* (2013.01); *F16J 15/106* (2013.01); *F16K 27/02* (2013.01); *F16L 23/10* (2013.01)

(58) Field of Classification Search
USPC .......... 285/363, 365; 277/608, 609, 616, 626, 277/627
See application file for complete search history.

(56) References Cited

U.S. PATENT DOCUMENTS 2,789,844 A * 4/1957 Kessler .................... 285/336
3,110,471 A * 11/1963 Kuhles .................... 251/318
(Continued)

FOREIGN PATENT DOCUMENTS

DE    82 30 776 U1    10/1986
EP    0645573 A2    3/1995
(Continued)

OTHER PUBLICATIONS

International Search Report dated Jan. 29, 2013, issued in corresponding International application No. PCT/JP2012/082147.
(Continued)

*Primary Examiner* — Aaron Dunwoody
(74) *Attorney, Agent, or Firm* — Westerman, Hattori, Daniels & Adrian, LLP

(57) ABSTRACT

A seal structure for a flow-path connection part is aligned easily. In a seal structure for a flow-path connection part including a pair of flanges arranged to face each other, the seal structure includes a gasket having protrusions provided symmetrically on front and back sides of the gasket at an outer periphery thereof or near the outer periphery, and flanges each having a receiving groove provided annularly in a connected surface thereof. The receiving groove is wider than the protrusion and it has an arc-shaped deepest portion against which a top portion of the protrusion abuts, and the top portion of the protrusion has a curved surface formed such that the curvature of the top portion is greater than or equal to the curvature of the deepest portion of the receiving groove. A liquid ejection device and a liquid storage container can include the seal structure.

12 Claims, 8 Drawing Sheets

(51) Int. Cl.
*F16J 15/10* (2006.01)
*F16L 23/10* (2006.01)
*F16K 27/02* (2006.01)

(56) References Cited

U.S. PATENT DOCUMENTS

| | | | |
|---|---|---|---|
| 3,498,649 A * | 3/1970 | Pfeuffer | 285/365 |
| 3,775,832 A * | 12/1973 | Werra | 29/450 |
| 4,681,329 A * | 7/1987 | Contin | 277/643 |
| 5,243,929 A * | 9/1993 | Brown et al. | 116/276 |
| 5,466,018 A * | 11/1995 | Stobbart | 285/334.2 |
| 5,749,586 A * | 5/1998 | Abe et al. | 277/608 |
| 5,904,382 A | 5/1999 | Bronnert | |
| 5,947,533 A * | 9/1999 | Fisher et al. | 285/350 |
| 6,039,319 A | 3/2000 | Coonce et al. | |
| 6,045,033 A * | 4/2000 | Zimmerly | 228/189 |
| 6,073,969 A * | 6/2000 | Zimmerly | 285/12 |
| 6,079,752 A * | 6/2000 | Meisinger | 285/363 |
| 6,234,545 B1 * | 5/2001 | Babuder et al. | 285/364 |
| 6,318,576 B1 * | 11/2001 | Graham et al. | 220/89.2 |
| 6,857,638 B2 * | 2/2005 | Dupont et al. | 277/608 |
| 7,134,315 B1 * | 11/2006 | Stigler et al. | 73/290 V |
| 7,350,833 B2 * | 4/2008 | Bongiorno | 285/367 |
| 7,390,580 B1 * | 6/2008 | Dupont | 428/692.1 |
| 8,240,718 B2 * | 8/2012 | Morton et al. | 285/312 |
| 2007/0045968 A1 * | 3/2007 | Long et al. | 277/608 |
| 2009/0179388 A1 * | 7/2009 | Uhlenkamp et al. | 277/608 |
| 2010/0230962 A1 * | 9/2010 | Bongiorno | 285/363 |
| 2011/0140374 A1 | 6/2011 | Dubiel | |
| 2012/0074694 A1 * | 3/2012 | Butte | 285/336 |
| 2014/0353927 A1 * | 12/2014 | Schroder | 277/626 |

FOREIGN PATENT DOCUMENTS

| | | |
|---|---|---|
| EP | 2 334 959 B1 | 6/2011 |
| JP | 05-172291 A | 7/1993 |
| JP | 07-158783 A | 6/1995 |
| JP | 08-93261 A | 4/1996 |
| JP | 2001-517287 A | 10/2001 |
| JP | 4450711 B2 | 4/2010 |
| WO | 01/014779 A1 | 3/2001 |

OTHER PUBLICATIONS

Supplemental European Search Report dated Mar. 23, 2015, issued in corresponding European Application No. 12 85 7576. (1 page).

* cited by examiner

Fig. 6
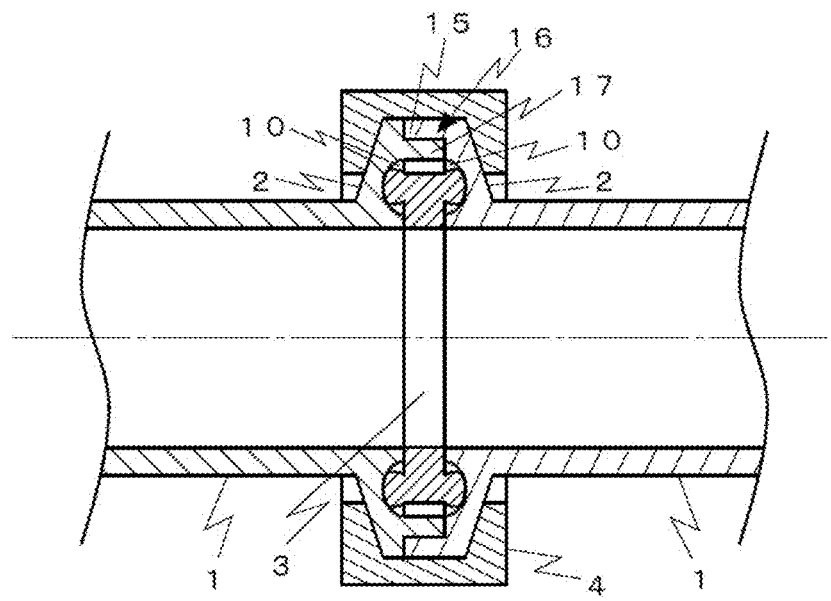
(a)
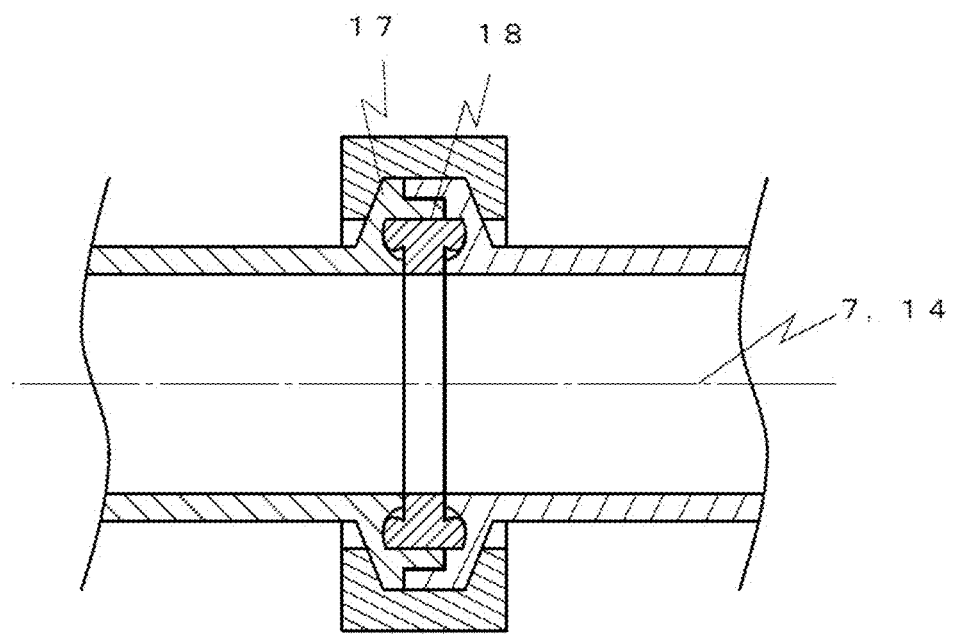
(b)

US 9,249,909 B2

SEAL STRUCTURE FOR FLOW-PATH CONNECTION PART

TECHNICAL FIELD

The present invention relates to a seal structure (sealing equipment) for use in a flow-path connection part of a pipe, a container, and so on.

BACKGROUND ART

A flange joint using a flange (i.e., a disk-like larger-diameter portion formed at an end of a pipe) has hitherto been known as a joint for a location where pipes for feeding fluids need to be removed in some cases. When connecting flanges to each other, a seal (gasket) is held between two flanges to prevent leakage of a fluid or intrusion of foreign matters from the outside. The gasket is mainly made of an elastic body and is fitted under compression into a groove that is formed in each of the flanges. Due to a repulsive force generated from the compressed gasket, the gasket is press-contacted with a wall surface of the groove, thus developing a sealing (enclosing) action.

In the case of feeding fluids (e.g., foods and pharmaceuticals) that require sanitary (hygienic) conditions, if a level difference (e.g., a recess or a projection) occurs in a pipe seam portion (particularly a gasket portion), the fluid accumulates in such a portion, and the sanitary conditions are no longer kept. Several proposals have been made to cope with the above-mentioned problem (Patent Documents 1 and 2).

Patent Document 1 discloses a pipe member connecting device for connecting and fixing respective connected ends of pipe members by joining the connected ends to each other with a ring-shaped packing interposed therebetween, and by tightening the connected ends with a clamp hand wound over an outer periphery of a joined portion, wherein both the tube members have annular abutment portions, which are formed at the connected ends of the pipe members and which are shaped such that, upon tightening with the clamp hand, the annular abutment portions are directly contacted with each other over entire circumferences thereof in a pipe axial direction and are engaged with each other in concave-convex relation, and the ring-shaped packing is placed in an annular recess formed in one of the connected ends on the inner peripheral side than the annular abutment portions, and is set such that the ring-shaped packing is brought into a compressed state when the annular abutment portions are directly contacted with each other, and that, in the compressed state, an inner periphery of the ring-shaped packing is substantially in flush with inner peripheral surfaces of both the pipe members.

Patent Document 2 discloses a flange coupling structure including flanges each having an end surface, which extends in a direction of radius thereof substantially perpendicular to an axis of a pipe, and each joined to a pipe end, a central circular opening penetrating through the end surface of the flange to be communicated with the inside of the pipe, and a device for fastening the flanges to each other in a state aligned in the axial direction, wherein the flange coupling structure comprises a seal chamber defined by an annular recess that is circumferentially formed around the central circular opening of the flange, and that is recessed inward in the axial direction, and an elastic seal ring positioned in the seal chamber and compressed in the seal chamber, the seal chamber and the elastic seal ring being dimensioned such that sealing pressure is generated from a wall surface of the seal chamber when flange sealing surfaces are directly engaged with each other.

LIST OF PRIOR-ART DOCUMENTS

Patent Documents

Patent Document 1: Japanese Patent No. 4450711
Patent Document 2: Japanese Patent Laid-Open Publication No. H7-158783

SUMMARY OF THE INVENTION

Problems to be Solved by the Invention

In each of the gaskets disclosed in the above-cited Patent Documents, the gasket has to be collapsed in conformity with the groove shape, and the collapsed gasket has to be in flush with the inner surface of the pipe. Therefore, dimensional accuracy required for the gasket and the pipes is necessarily severe.

Moreover, in each of the gaskets disclosed in the above-cited Patent Documents, because alignment of respective centers of the pipe and the gasket is obtained for the shape of the gasket in a state after being collapsed, it has been difficult to align the centers of the pipe and the gasket with each other.

In view of the above-described situation, an object of the present invention is to provide a seal structure for a flow-path connection part, which enables respective centers of a flow path and a gasket to be aligned easily without high dimensional accuracy (with normal dimensional accuracy).

Means for Solving the Problems

According to a first invention, there is provided a seal structure for a flow-path connection part including a pair of flanges arranged to face each other, the seal structure comprising a gasket having protrusions provided symmetrically on front and back sides of the gasket at an outer periphery thereof or near the outer periphery, and flanges each having a receiving groove provided annularly in a connected surface thereof, wherein the receiving groove is wider than the protrusion and has an arc-shaped deepest portion against which a top portion of the protrusion abuts, and the top portion of the protrusion has a curved surface formed such that the curvature of the top portion is greater than or equal to the curvature of the deepest portion of the receiving groove.

According to a second invention, in the first invention, an inner diameter of the gasket becomes equal to an inner diameter of the flange when an inner portion of the protrusion of the gasket is pressed between the connected surfaces of the flanges.

According to a third invention, in the first invention, the pair of flanges include an engagement portion on outer peripheral side of the receiving grooves.

According to a fourth invention, in the first invention, the receiving groove has an inner surface defining an outer region of the receiving groove, the inner surface being abutted against an outer peripheral surface of the gasket and being a surface parallel to a center axis.

According to a fifth invention, there is provided a liquid ejection device including the seal structure for the flow-path connection part according to the first invention.

According to a sixth invention, there is provided a liquid storage container including the seal structure for the flow-path connection part according to the first invention.

Advantageous Effects of the Invention

With the present invention, respective centers of the flange and the gasket are aligned easily without high dimensional accuracy.

Furthermore, since the flange and the gasket are contacted with each other at multiple points, high sealing pressure can be realized.

BRIEF DESCRIPTION OF THE DRAWINGS

FIG. 5(a) represents a state where the centers are going to be aligned, FIG. 5(b) represents a state where the centers are aligned, and FIG. 5(c) represents a state where the centers are fixedly held.

FIG. 6 is a sectional view illustrating an example of a receiving groove shape according to a second embodiment; specifically, FIG. 6(a) represents the case where the receiving groove and an engagement portion are disposed separately from each other, and FIG. 6(b) represents the case where a part of the receiving groove is omitted and replaced with the engagement portion.

MODE FOR CARRYING OUT THE INVENTION

Embodiments for practicing the present invention will be described below.

First Embodiment

Figure 1:
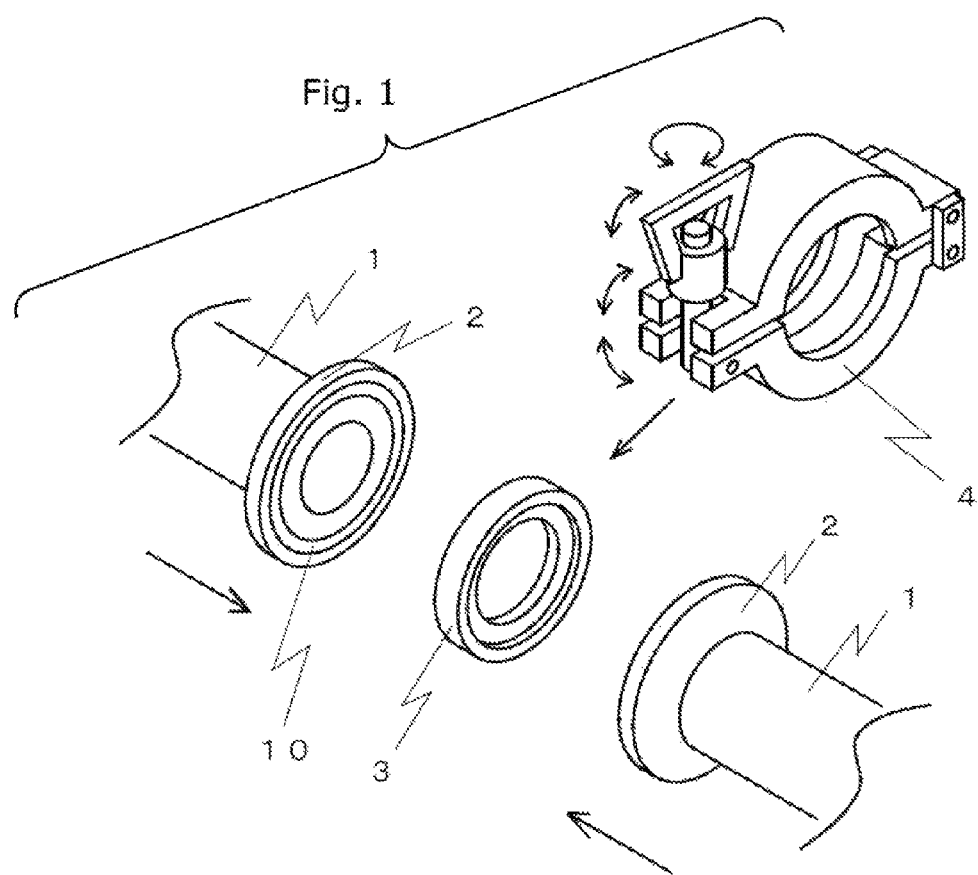
FIG. 1 is a perspective view illustrating an example of a pipe connection part to which the present invention is applied.

A first embodiment discloses an example in which, as illustrated in FIG. 1, pipes 1 having flanges 2 are connected to each other with a gasket 3 interposed between them, and are fixed by a clamp 4. The structures of a gasket and a receiving groove according to this embodiment is first described, and a pipe connection method is then described.

(1) Structures a. Gasket

Figure 2:
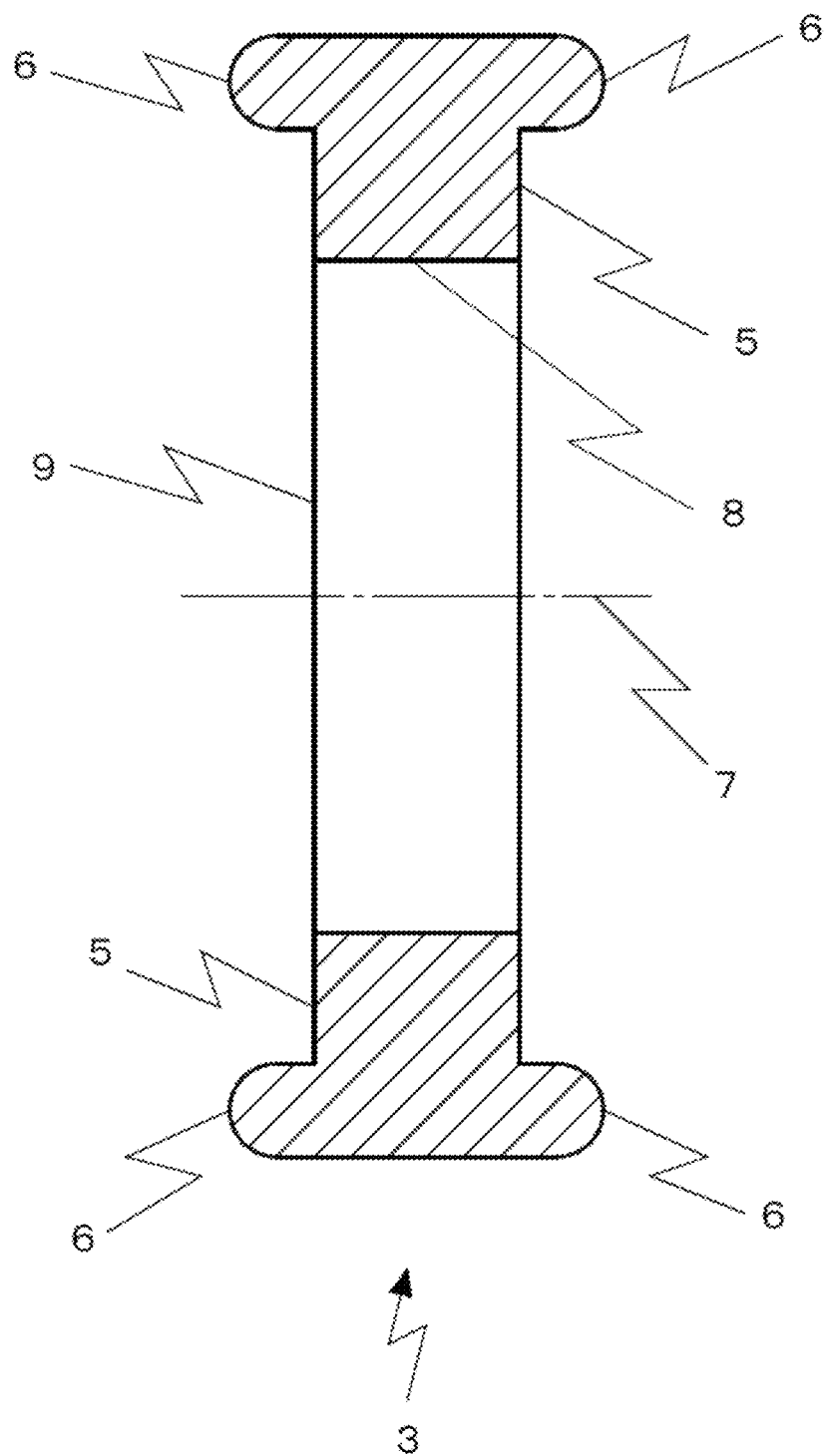
FIG. 2 is a sectional view illustrating a gasket according to a first embodiment.

FIG. 2 illustrates a sectional shape of a gasket 3 according to this embodiment.

The gasket 3 according to this embodiment is an annular elastic body, and it has a flat portion 5 and protrusions 6 provided symmetrically on the front and back sides of the gasket (to protrude in the same direction as a center axis 7) at an outer periphery thereof.

A penetrating hole 9 through which a fluid flows is formed in a central region of the flat portion 5. A diameter of the penetrating hole 9 is set slightly greater than an inner diameter of each pipe 1 such that an inner peripheral surface 8 of the gasket and an inner peripheral surface of each pipe 1 are positioned in flush with each other in a state where the gasket is deformed by being fixedly held between the pipes 1 and 1. Thus, because no level difference occurs at a pipe seam portion, sanitary conditions can be kept and flow resistance can be reduced.

A top portion of each protrusion 6 (i.e., its portion facing in the same direction as the center axis 7) has a curved surface, and a sectional shape of the top portion is semicircular or semi-elliptic. The protrusions 6 are provided symmetrically on the front and back sides of the gasket at the outer periphery thereof or near the outer periphery in annular shapes that are matched with shapes of receiving grooves 10. In other words, the gasket 3 is formed symmetrically with respect to a centerline extending in a direction perpendicular to the center axis 7. The curvature of the protrusion 6 is set greater than that of a recessed surface of the receiving groove 10 (stated in another way, the radius of the former is set smaller than that of the latter), and the rise (height) of the protrusion 6 from the flat portion 5 is set greater than the depth of the receiving groove 10. The reason why the curvature of the protrusion 6 is preferably set greater resides in facilitating center alignment. The reason why the height of the protrusion 6 is set greater than the depth of the receiving groove 10 resides in providing sealing pressure with the aid of a repulsive force that is generated upon collapse of the protrusion 6 when the flanges 2 are fixed. In order to realize high sealing pressure, the gasket 3 is made of rubber using, e.g., silicone, PTFE, or nitrile as a raw material.

b. Receiving Groove

Figure 3:
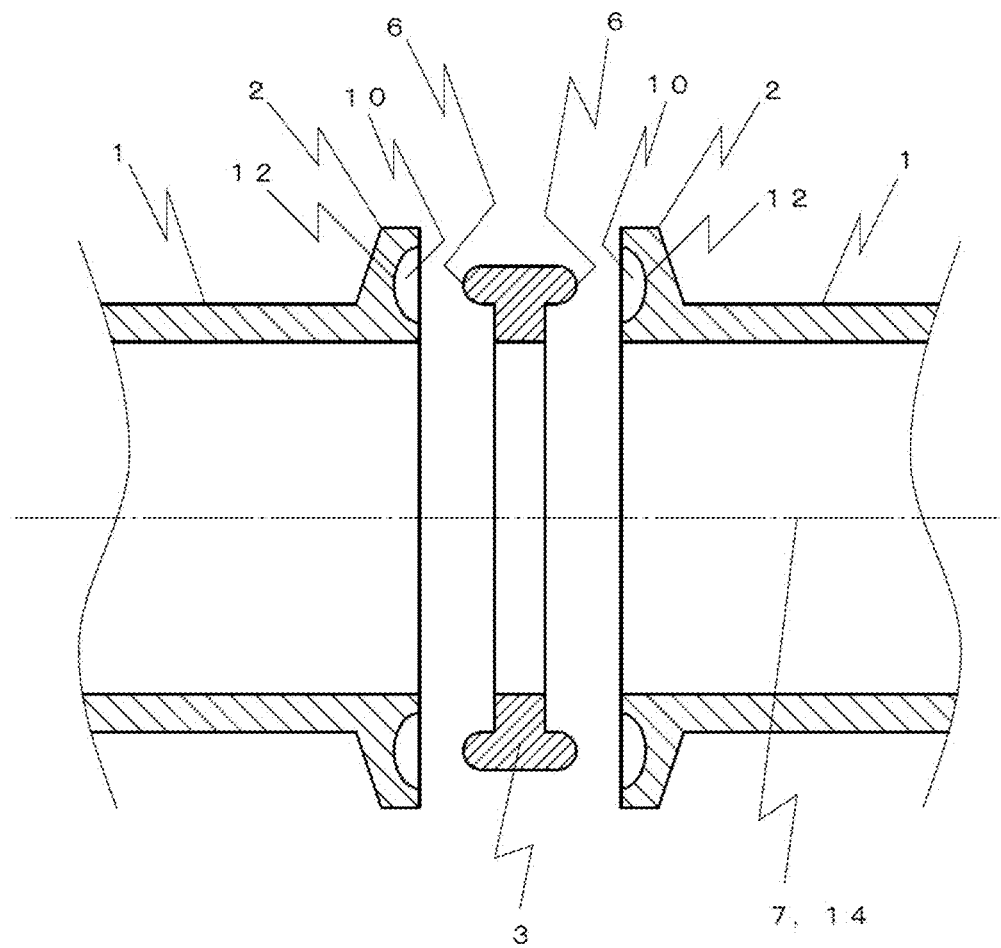
FIG. 3 is a sectional view illustrating a receiving groove according to the first embodiment.

As illustrated in FIG. 3, the receiving groove 10 is formed in a connected surface of the flange 2 that is provided at each pipe end. The receiving groove 10 according to this embodiment is an annular recess having a semicircular or semi-elliptic sectional shape and formed in the connected surface of the flange 2. The curvature of the recessed surface of the receiving groove 10 is set smaller than that of the top portion of the protrusion 6 (stated in another way, the radius of the former is set greater than that of the latter). The reason resides in realizing a center aligning action described later. Here, the curvature of the entire recessed surface is not necessarily required to be smaller than or equal to that of the top portion of the protrusion 6. Thus, it is required that the curvature of at least a region near a deepest portion of the receiving groove 10 is smaller than or equal to that of the top portion of the protrusion 6.

Furthermore, the depth of the receiving groove 10 is smaller than the height of the protrusion 6 of the gasket 3, and the width of the receiving groove 10 is greater than that of the protrusion 6 of the gasket 3. The reason resides in making the protrusion 6 of the gasket 3 collapsed when the flanges 20 are fixed, and in providing sealing pressure with the aid of a repulsive force that is generated upon collapse of the protrusion 6.

(2) Connecting Method a. Connection by Clamp 4

Figure 4:
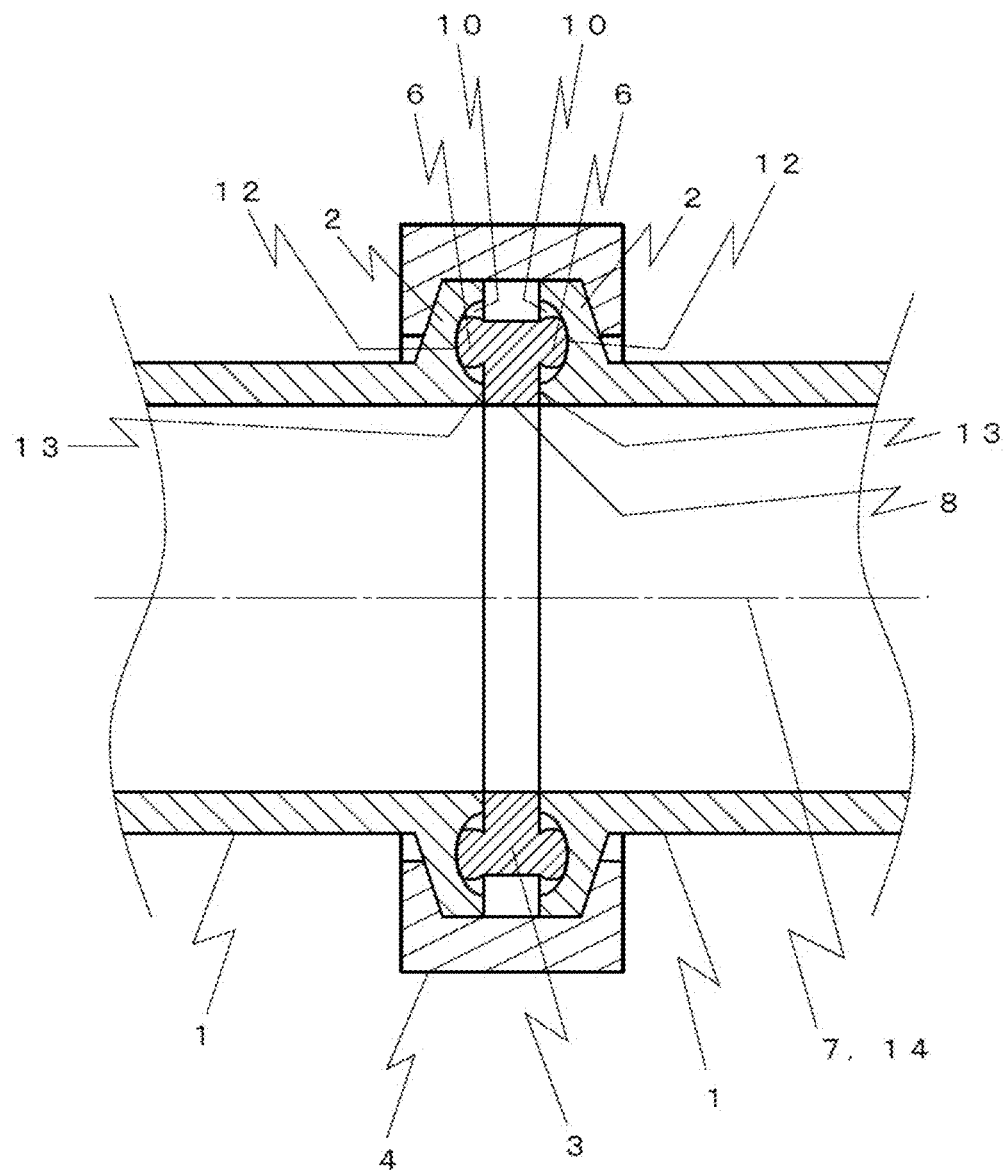
FIG. 4 is a sectional view illustrating a state where a seal structure according to the first embodiment is in a state fastened by a clamp.

FIG. 4 illustrates a state where the pipes 1, each having the flange 2 in which the receiving groove 10 is formed, are connected to each other by the clamp 4 with the gasket 3 interposed between the flanges 2. While, in this embodiment, the ends of the pipes 1 are not directly contacted with each other when the pipes are connected by the clamp, the ends of the pipes 1 may be directly contacted with each other, and a later-described inner surface 18 defining an outer region of the receiving groove may be formed.

When the pipes 1 are properly connected to each other, the protrusions 6 of the gasket 3 are each brought into a state fitted to a deepest portion 12 of the receiving groove 10. Furthermore, the seal structure is designed such that, in the above-mentioned state, the gasket center axis 7 and the pipe center axis 14 are aligned with each other.

Because the height of the protrusion 6 is greater than the depth of the receiving groove 10, the protrusion 6 is collapsed when the pipes 1 are connected to each other with the protrusion 6 being in the state fitted to the deepest portion 12 of the receiving groove 10. Moreover, respective center-side ends 13 and 13 of the connected surfaces of the flanges 2 and 2 facing each other sandwich the flat portion 5 while pressing the flat portion 5 to be collapsed. Therefore, the gasket 3 is press-contacted with the flange at two positions, i.e., at the deepest portion 12 and the center-side end 13, whereby the sealing pressure can be increased. In addition, because the gasket 3 undergoes outward pressure from the inside of the pipe 1, an outer portion of the protrusion 6 is pressed against the receiving groove 10. That action contributes to further increasing the sealing pressure.

While one example of means for connecting the pipes 1 to each other with the gasket 3 brought into the collapsed state is the clamp 4 such as illustrated in FIG. 1, the present invention is not limited to the use of the clamp. As another example, the flanges 20 may be directly connected to each other by employing bolts and nuts.

b. Center Aligning Action

Figure 5:
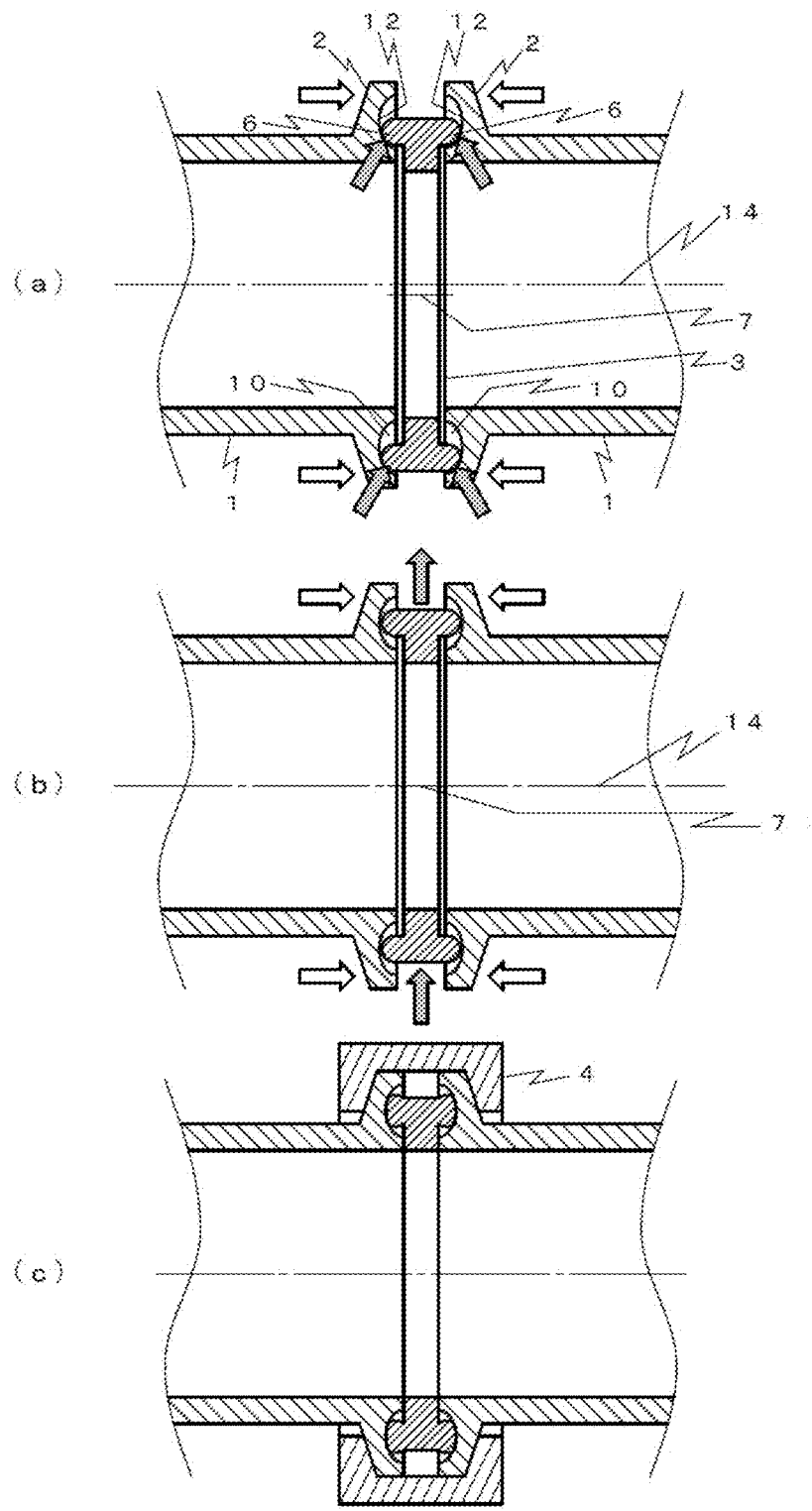
FIG. 5 is a sectional view illustrating a process through which respective centers of the gasket and a pipe are aligned with each other according to the first embodiment; specifically.

When the pipes 1 are connected to each other with the gasket 3 interposed between them, the gasket center axis 7 and the pipe center axis 14 need to be aligned with each other. Even if both the center axes are shifted in a step of manual positioning, the gasket center axis 7 and the pipe center axis 14 can be naturally aligned with each other in this embodiment during a series of operations for connecting the pipes 1. Such a process is illustrated in FIG. 5.

When the pipes 1 are approached to each other in the state where the gasket 3 is fitted into the receiving grooves 10 in not-centered relation, each protrusion 6 undergoes a force (denoted by a solid filled arrow) acting in a direction toward the deepest portion 12 by a contact action between the curved inner surface of the receiving groove 10 and the curved surface of the protrusion 6. Therefore, the gasket 3 starts to move (FIG. 5(a)). When the protrusion 6 of the gasket 3 reaches the deepest portion 12 of the receiving groove 10, the gasket center axis 7 and the pipe center axis 14 are aligned with each other, whereupon the movement of the gasket 3 is stopped (FIG. 5(b)). By fixing the pipes 1 to each other in the above-mentioned state while the gasket 3 is brought into the collapsed state, the pipes can be fixedly held in the state where the gasket center axis 7 and the pipe center axis 14 are aligned with each other. (FIG. 5(c)).

Thus, the gasket center axis 7 and the pipe center axis 14 are aligned with each other through the ordinary operation for connecting the pipes 1 to each other. Furthermore, as seen from FIGS. 5(a) and 5(b), the center alignment can be established before the gasket 3 is pressed and collapsed between the center-side ends 13.

According to this embodiment, as described above, since the gasket protrusion and the receiving groove are shaped to have curved surfaces, the respective centers of the gasket and the pipe can be naturally aligned with each other. Therefore, severe dimensional accuracy is no longer required, and the manufacturing cost can be reduced. Furthermore, since the gasket is collapsed and fixed at two positions, i.e., at the deepest portion 12 and the center-side end 13, and the sealing pressure is further generated by a force acting against the pressure applied from the inside of the pipe, large sealing pressure can be obtained.

Second Embodiment

A second embodiment relates to a seal structure in which the pipes 1 are formed to be "engageable" with each other such that the respective centers of the pipes 1 can be aligned more easily with higher reliability.

In this embodiment, as illustrated in FIG. 6, the flanges 2 include projected portions 15 and 17 formed on the outer peripheral side of the receiving grooves 10 in shapes engageable with each other. The projected portions 15 and 17 are engaged with each other to provide an annular engagement portion 16. The projected portions 15 and 17 may be formed separately from the receiving grooves 10 (FIG. 6(a)). Alternatively, when there is a problem with sizes of the projecting flanges 2, the receiving grooves 10 may be each formed in an arc shape having a central angle of 90 degrees to reduce the flange size (FIG. 6(b)). On that occasion, the effect of increasing the sealing pressure with the aid of the pressure applied from the inside of the pipes 1 is obtained by forming an inner surface 18 defining an outer region of the receiving groove and positioned inside the projected portion 17 as a surface parallel to the center axes 7 and 14 such that the outer peripheral surface of the gasket 3 is abutted against the inner surface 18. It is to be noted that the structure including the inner surface 18 defining the outer region of the receiving groove, as illustrated in FIG. 6(b), requires higher dimensional accuracy than in FIG. 6(a).

Also in this embodiment, since the curvature of the region near the deepest portion 12 of the receiving groove 10 is set smaller than that of the curved surface of the gasket protrusion 6, the center aligning effect can be naturally developed when the pipes 1 are connected to each other.

Furthermore, with the provision of the engagement portion 16, an extent of the collapse of the gasket 3 during the operation for the pipe connection is held constant, and breakage or deformation (plastic deformation) caused by excessive collapse can be prevented.

Third Embodiment

A third embodiment represents, as an example of application to a connection portion of a device for handling a fluid, the case where the seal structure is employed in a needle valve that is one type of a liquid ejection device. In application to a valve, the seal structure is preferably employed in a flow path communicating with a component that is frequently disassembled or replaced, e.g., an ejection unit including a nozzle and a valve sheet.

Figure 7:
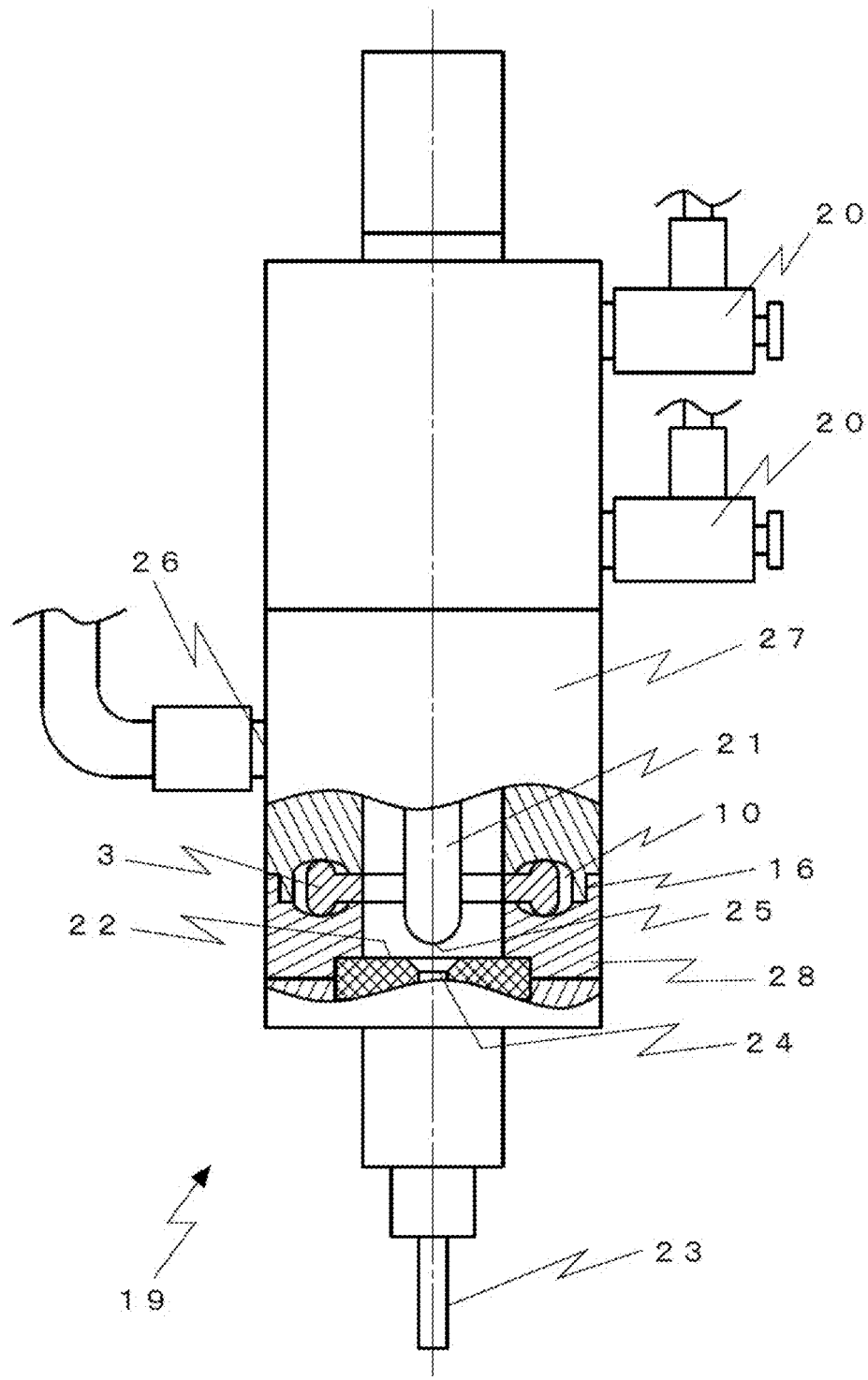
FIG. 7 is a partial sectional view illustrating a valve according to a third embodiment.

In a needle valve 19 illustrated in FIG. 7, a liquid material is ejected from a nozzle 23 by driving a not-illustrated piston, to which a needle 21 is connected, with air supplied and discharged through couplings 20 such that a communication hole 24 is opened and closed by a needle end 25. The liquid material is supplied from a liquid-material supply port 26 communicating with a liquid storage container (not illustrated).

In this embodiment, the gasket 3 and the receiving grooves 10 are disposed between a valve body 27 and an ejection unit 28 that includes a valve sheet 22 and a nozzle 23. Moreover, an engagement portion 16 is formed by providing mutually engageable projected portions on the outer peripheral side of the receiving grooves 10. The valve body 27 and the ejection unit 28 are fixed to each other, for example, by screwing (bolting) at portions where the gasket is not present.

By providing the seal structure between the valve body 27 and the ejection unit 28 as described above, high sealing pressure can be realized reliably. Furthermore, maintenance work for the valve sheet 22 and the nozzle 23, which are frequently disassembled for cleaning or replaced, is facilitated, and the sanitary conditions can be kept easily.

The seal structure of this embodiment may be further applied, for example, to a joint of the liquid-material supply port 26, or to a position partitioning a piston accommodation chamber (not illustrated) and a fluid chamber where the valve end is positioned.

Fourth Embodiment

A fourth embodiment discloses the case where the seal structure is applied to a liquid storage container.

Figure 8:
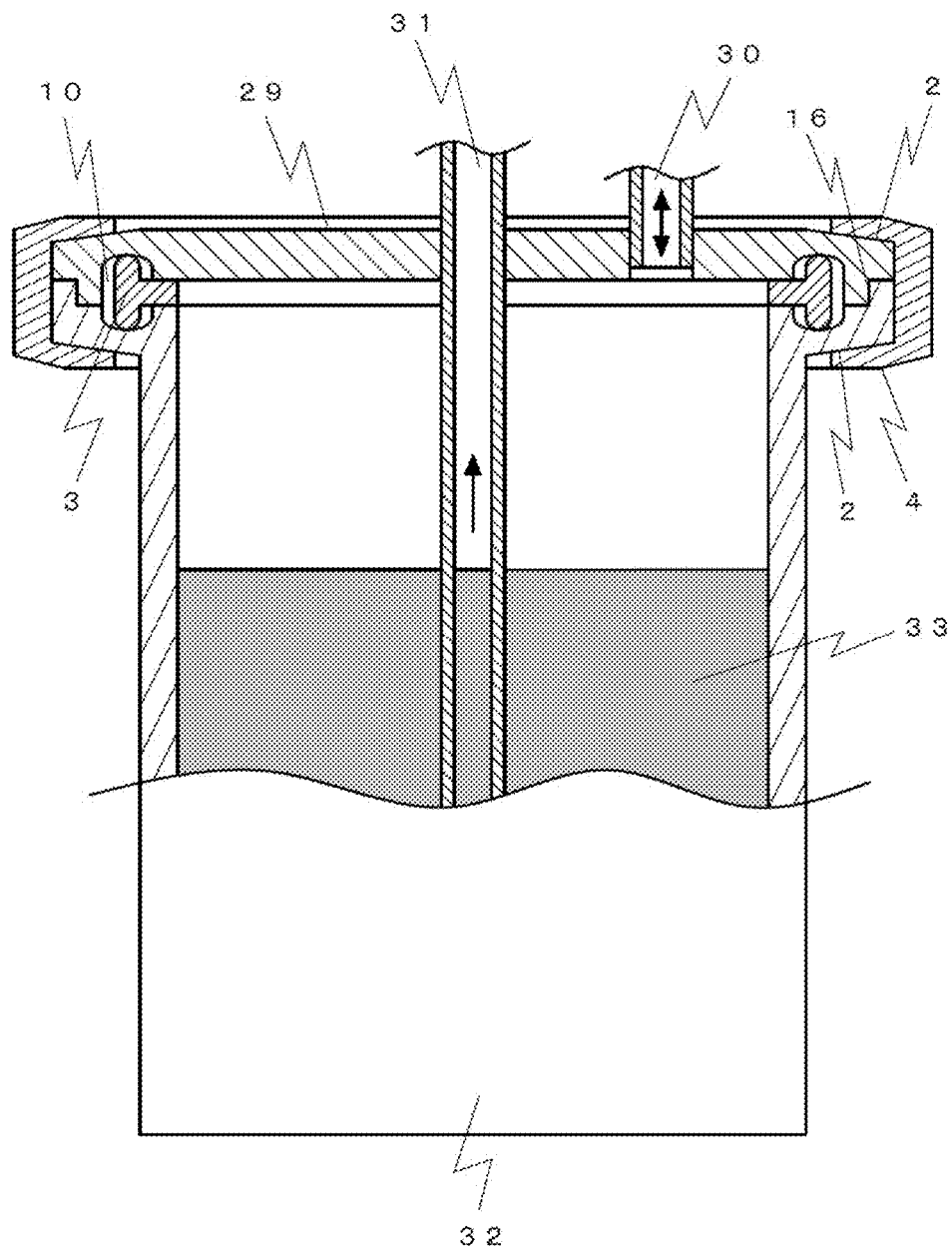
FIG. 8 is a partial sectional view illustrating a tank cover according to a fourth embodiment.

A liquid storage container according to this embodiment, illustrated in FIG. 8, is a pressure tank including a cover 29 provided with a supply/discharge port 30 through which pressurized gas is supplied and discharged, and with a suction pipe 31 through which a pressurized liquid material 33 stored in a tank 32 is discharged to the outside. The cover 29 is fixed to a body of the tank 32 by forming flanges 2 at an upper end of the tank 32 and at an outer edge of the cover 29, and by clamping the flanges 2 with a clamp 4 such as illustrated in FIG. 1.

In this embodiment, the gasket 3 and the receiving grooves 10 are disposed between and in the flange at the upper end of the body of the tank 32 and the flange 2 at the outer edge of the cover 29. Moreover, an engagement portion 16 is formed by providing mutually engageable projected portions on the outer peripheral side of the receiving grooves 10.

In the liquid storage container of this embodiment, high sealing pressure can be realized reliably. Furthermore, maintenance work is facilitated, and the sanitary conditions can be kept easily.

LIST OF REFERENCE SYMBOLS

1: pipe 2: flange 3: gasket 4: clamp 5: annular member 6: protrusion 7: gasket center (axis) 8: inner peripheral surface of gasket 9: hole through which fluid passes 10: receiving groove 12: deepest portion 13: center-side end of flange 14: pipe center (axis) 15: projected portion (outer projected portion) 16: engagement portion 17: projected portion (inner projected portion) 18: inner surface defining outer region of receiving groove 19: needle valve 20: coupling 21: needle 22: valve sheet 23: nozzle 24: communication hole 25: needle end 26: liquid material supply port 27: ejection unit 28: valve body 29: cover 30: supply/discharge port 31: suction pipe 32: tank 33: liquid material

The invention claimed is:

1. A seal structure for a flow-path connection part including a pair of flanges arranged to face each other, the seal structure comprising:
    a gasket having protrusions provided symmetrically on front and back sides of the gasket at an outer periphery thereof or near the outer periphery; and
    the flanges each having a receiving groove provided annularly in a connected surface thereof,
    wherein the receiving groove is wider than the protrusion and has an arc-shaped deepest portion against which a top portion of the protrusion abuts, and
    the top portion of the protrusion has a curved surface formed such that the curvature of the top portion is greater than or equal to the curvature of the deepest portion of the receiving groove,
    wherein a curved surface that forms the arc-shaped deepest portion within the receiving groove being less than a curved surface that forms the entire receiving groove provided in the connected surface, the curved surface of the protrusion abuts less than the entire curved surface of the receiving groove.

2. The seal structure for the flow-path connection part according to claim 1, wherein an inner diameter of the gasket becomes equal to an inner diameter of the flange when an inner portion of the protrusion of the gasket is pressed between the connected surfaces of the flanges.

3. The seal structure for the flow-path connection part according to claim 1, wherein the pair of flanges include an engagement portion on outer peripheral side of the receiving grooves.

4. The seal structure for the flow-path connection part according to claim 1, wherein the receiving groove has an inner surface defining an outer region of the receiving groove, the inner surface being abutted against an outer peripheral surface of the gasket and being a surface parallel to a center axis.

5. A liquid ejection device including the seal structure for the flow-path connection part according to claim 1.

6. A liquid storage container including the seal structure for the flow-path connection part according to claim 1.

7. A seal structure for a flow-path connection part including a pair of flanges arranged to face each other, the seal structure comprising:
    a gasket having protrusions provided symmetrically on front and back sides of the gasket at an outer periphery thereof or near the outer periphery; and
    the flanges each having a receiving groove provided annularly in a connected surface thereof,
    wherein the receiving groove is wider than the protrusion and has an arc-shaped deepest portion against which a top portion of the protrusion abuts,
    the top portion of the protrusion has a curved surface formed such that the curvature of the top portion is greater than or equal to the curvature of the deepest portion of the receiving groove, and that a height of the protrusion is greater than a depth of the receiving groove, and
    when the flanges are approached to each other in a state where the gasket is fitted into the receiving grooves in not-centered relation, each protrusion undergoes a force acting in a direction toward the deepest portion, and movement of the gasket is stopped upon the protrusion reaching the deepest portion and respective centers of the gasket and the flanges being aligned with each other.

8. The seal structure for the flow-path connection part according to claim 7, wherein an inner diameter of the gasket becomes equal to an inner diameter of the flange when an inner portion of the protrusion of the gasket is pressed between the connected surfaces of the flanges.

9. The seal structure for the flow-path connection part according to claim 7, wherein the pair of flanges include an engagement portion on outer peripheral side of the receiving grooves.

10. The seal structure for the flow-path connection part according to claim 7, wherein the receiving groove has an inner surface defining an outer region of the receiving groove, the inner surface being abutted against an outer peripheral surface of the gasket and being a surface parallel to a center axis.

11. A liquid ejection device including the seal structure for the flow-path connection part according to claim 7.

12. A liquid storage container including the seal structure for the flow-path connection part according to claim 7.

* * * * *